United States Patent [19]
Nishizawa et al.

[11] Patent Number: 5,960,912
[45] Date of Patent: Oct. 5, 1999

[54] VIBRATION DAMPER FOR A DRUM BRAKE

[75] Inventors: Yukio Nishizawa; Hironobu Saka, both of Itami, Japan

[73] Assignee: Sumitomo Electric Industries, Ltd., Osaka, Japan

[21] Appl. No.: 08/870,672

[22] Filed: Jun. 6, 1997

[30] Foreign Application Priority Data

Jun. 7, 1996 [JP] Japan ..................................... 8-145628

[51] Int. Cl.⁶ .................................................. F16D 66/00
[52] U.S. Cl. ................................... 188/1.11 E; 188/250 E
[58] Field of Search ......................... 188/11.1 L, 11.1 E, 188/73.36, 73.38, 325, 327, 218, 205 E; 192/30 V, 30 W, 207; 267/136; 303/194

[56] References Cited

U.S. PATENT DOCUMENTS

| | | | |
|---|---|---|---|
| 4,950,966 | 8/1990 | Moulds, III | 267/136 |
| 5,099,967 | 3/1992 | Lang | 188/328 |
| 5,209,326 | 5/1993 | Harper | 267/136 |
| 5,372,221 | 12/1994 | Jalbert | 188/1.11 L |
| 5,409,078 | 4/1995 | Ishioka et al. | 188/378 |
| 5,653,317 | 8/1997 | Wakui | 267/136 |
| 5,660,251 | 8/1997 | Nishizawa et al. | 188/73.35 |

FOREIGN PATENT DOCUMENTS 0 353 857 A 1  2/1990  European Pat. Off. .

OTHER PUBLICATIONS

European Patent Office Abstract of Japanese Patent Publication No. 04054325, published Feb. 21, 1992.

*Primary Examiner*—Robert J. Oberleitner
*Assistant Examiner*—Thomas J. Williams
*Attorney, Agent, or Firm*—Wenderoth, Lind & Ponack, L.L.P.

[57] ABSTRACT

In order to effectively damp the vibration of the drum of a drum brake, which is a main cause of brake squeals, a vibration detector and a vibrator are provided and operated separately from each other. The vibration damping control is carried out directly mechanically, or in a non-contact manner to improve durability of the device. A piezoelectric element, magnetic sensor or acceleration sensor is used to detect the vibration of the drum. The detected vibration is converted to an electric signal. After adjusting its phase and amplitude, the electric signal is converted to vibration force and outputted through a piezoelectric element or magnetic actuator as the vibrator to suppress brake squeals.

21 Claims, 4 Drawing Sheets

VIBRATION DAMPER FOR A DRUM BRAKE

BACKGROUND OF THE INVENTION

The present invention relates to a vibration damper for damping vibration of a drum brake in a positive manner, thus suppressing squeals of the drum brake during braking.

Most widely used means for reducing squeals of disc and drum brakes are mechanical vibration dampers for damping vibrations by binding the brake shoes or the friction pads with resilient members or moving the portions pressed against each other. More recent dampers include one that utilizes feedback control, as disclosed in unexamined Japanese patent publication 4-54325.

The damper disclosed in this publication, which is shown in FIG. 8, comprises a vibration detection sensor 115 provided on the back of a friction pad 112 for detecting the vibration of the pad, and a vibration actuator 116 provided parallel to the sensor 115 for suppressing the vibration of the disc 110, thereby reducing squeals of the brake.

In this conventional arrangement, the vibration of a friction pad, which is one of vibration sources, is detected and vibration force is applied to the pad. But since the main vibration source is the disc, it is difficult to efficiently damp brake vibrations.

In the above prior art, since the vibration detector detects the vibration of the friction member to which the vibration force is applied from the vibrator, the detector inevitably detects the vibration component applied from the vibrator, besides the vibration of the disc itself. Since it is impossible to detect only the vibration of the disc, detection accuracy is low. Since the vibrator applies vibration force based on the detection signal from the detector, it is difficult to efficiently reduce the vibration of the disc.

An object of the present invention is to provide a drum brake vibration damper which can eliminate the above-described undesirable vibration component from being picked up and can produce more proper vibration signal.

SUMMARY OF THE INVENTION

A leading cause of squeals of a drum brake is the vibration of the drum. According to the present invention, there is provided a vibration damper capable of efficiently damping the vibration of the drum. Such a damper comprises a vibration detector for detecting the vibration of the drum, and a vibrator for applying vibration force to the drum to damp the vibration of the drum. The vibration detector and the vibrator are operated separately from each other. It is thus possible to directly damp the vibration of the drum.

Specifically, the damper comprises a piezoelectric element as the vibration detector provided between one of two brake shoes and a piston for pressing the one brake shoe against the drum, a piezoelectric element as the vibrator provided between the other brake shoe and a piston for pressing the other shoe against the brake.

The piezoelectric element as the vibration detector detects the vibration of the drum when the one brake shoe is in contact with the drum, converts the detected vibration to an electric signal, and inputs the signal in a control circuit. The control circuit adjusts the phase and amplitude of the electric signal and, based on this signal, controls the piezoelectric element as the vibrator to suppress brake squeals.

In an arrangement in which the vibrator is in direct contact with one of the brake shoes, while the detector is out of contact with the drum, the detector is a magnetic sensor fixed to an outer case of the wheel cylinder and adapted to detect variations in magnetic inductance produced between the drum inner surface and the magnetic sensor. Even while the brake is not applied, the gap between the drum inner surface and the pole piece of the magnetic sensor fluctuates as the vehicle wheel rotates. But the vibration frequency of the drum while the brake is squealing is one to ten-odd kilohertz, which is much higher than the frequency of variations in gap while the brake is not applied. Thus, it is possible to remove such variations as noise. Any variation in inductance detected by the magnetic sensor is converted to an electric signal and inputted in the control circuit, where the signal is amplified and its phase is reversed. The amplified and phase-reversed signal is used to control the piezoelectric element as the vibrator, which is in contact with the other brake shoe, to suppress brake squeals.

In another arrangement, an acceleration sensor as the vibration detector is mounted on a brake shoe, while a magnetic actuator as the vibrator is mounted on an outer case of an anchor while kept out of contact with the drum. Any variation in acceleration detected by the acceleration sensor is converted to an electric signal and inputted in the control circuit, where the phase and amplitude of the signal are adjusted and used to control the piezoelectric element as the vibrator to suppress brake squeals.

In still another arrangement, a magnetic sensor as the vibration detector is fixed to the outer case of the anchor, while a magnetic actuator as the vibrator is mounted on the anchor while kept out of contact with the drum. Any variation in inductance detected by the magnetic sensor is converted to an electric signal and inputted in the control circuit, where the phase and amplitude of the signal are adjusted and used to control the piezoelectric element as the vibrator, which is in contact with the other shoe, to suppress brake squeals.

The magnetic sensor preferably includes, besides a first coil, a second coil arranged in series with the first coil, so as to detect the difference in output between the first and second coils.

Other features and objects of the present invention will become apparent from the following description made with reference to the accompanying drawings, in which:

DETAILED DESCRIPTION OF THE PREFERRED EMBODIMENT

Preferred embodiments according to the present invention are described with reference to the accompanying drawings.

(Embodiment 1)

Figure 1:
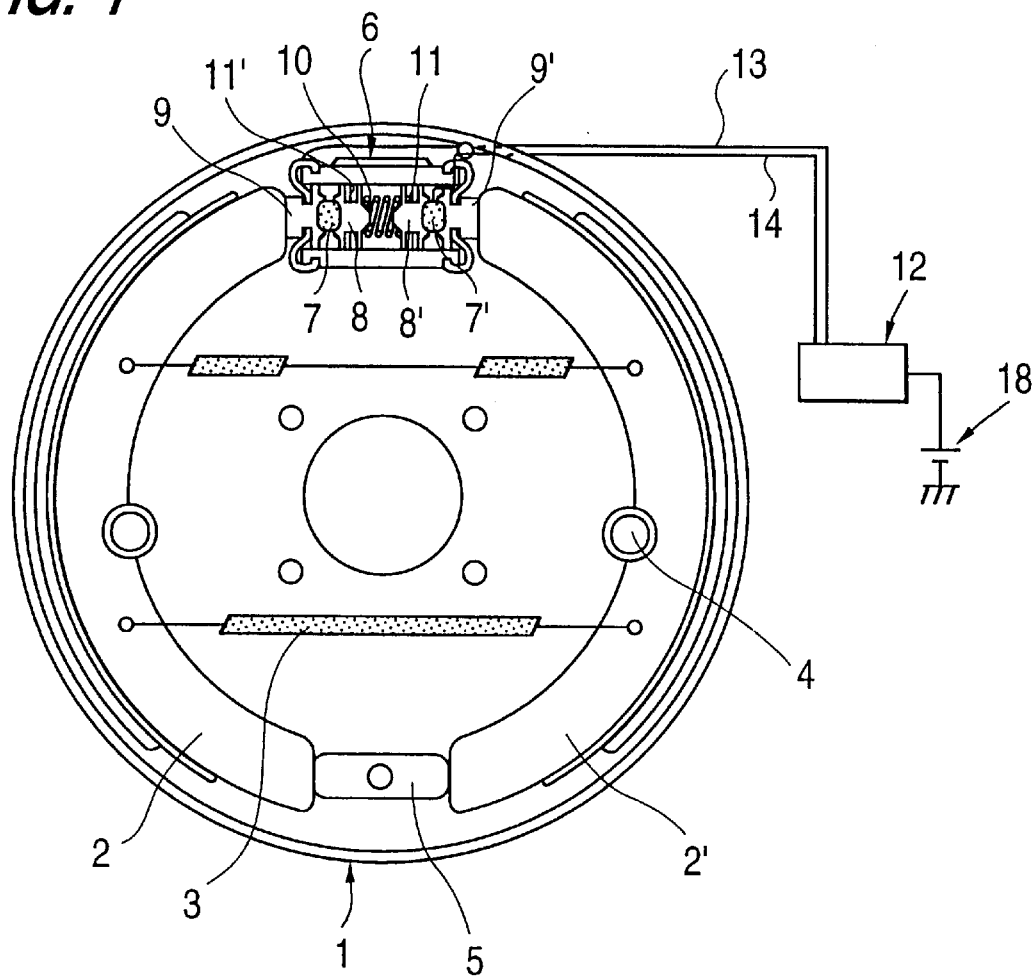
FIG. 1 shows a first embodiment of the present invention, in which piezoelectric elements as a vibration detector and a vibrator are mounted on different members.

FIG. 1 shows a drum brake of the first embodiment. A drum 1 is fixed to the axle. The drum brake includes a pair of brake shoes 2, 2' mounted in the drum 1. They are pivotally coupled together at one end thereof by an anchor 5 and supported by shoe holders 4. Shoe return springs 3 pull the shoes toward each other. A wheel cylinder 6 is coupled to the other ends of the shoes 2, 2'. Biased by the cylinder 6, the shoes are pivoted outwardly away from each other about the anchor 5 into contact with the inner surface of the drum 1.

To detect vibrations of the drum 1 while the brake is applied, a laminated piezoelectric element 7 is provided between a first piston 8 and a second piston 9 in the wheel cylinder 6. Numeral 10 designates a piston ring. Numerals 11, 11' indicate cup seals which liquid-tightly seal brake fluid pressure from the master cylinder (not shown). The second piston 9 has its one end in contact with the brake shoe 2.

A laminated piezoelectric element 7' as a vibrator is provided between a first piston 8' and a second piston 9' and kept in contact with the other brake shoe 2'. Vibrations of the drum 1 detected by the piezoelectric element 7 are converted to an electric signal and inputted in a feedback control circuit 12. Numerals 13 and 14 indicate, respectively, an input lead and an output lead connected to the control circuit 12.

Strictly speaking, since the vibration of the drum is detected through the brake shoe, the vibration detector 7 detects both the vibration of the drum and that of the brake shoe 2. But since in this invention no vibration is applied to the brake shoe 2, the brake shoe vibration is considered to be practically zero. Thus in a practical sense, the detector detects only the vibration of the drum through the shoe 2. The term "brake shoe vibration" herein used refers to the vibration originating from the shoe itself and not to the vibration of the shoe induced by the drum.

Figure 2:
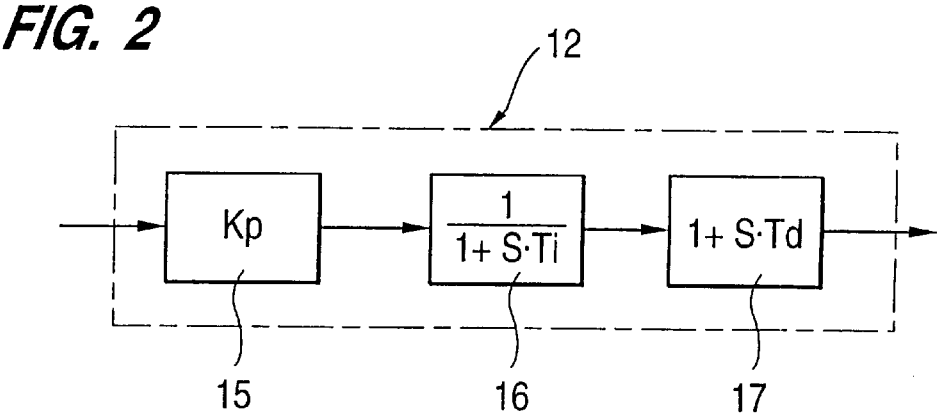
FIG. 2 is a flowchart of a feedback control circuit of the present invention.

FIG. 2 shows the detailed structure of the control circuit 12. It comprises a proportional circuit 15 for receiving a vibration detection signal from the vibration detector 7 and amplifying the signal by Kp times, and an integration circuit 16 and a differentiation circuit 17 for integrating and differentiating the amplified signal. In the figure, the letter S is a Laplace variable, and letters Ti an Td are time constants. The electric signal from the circuit 12 is converted to a vibration force by the piezoelectric element 7' as a vibrator, and the vibration force is applied to the other brake shoe 2'. The Kp, Ti, and Td values are adjusted to minimize the vibration of the drum 1. The control circuit 12 can be powered by the car battery 18.

Since the piezoelectric element 7 is used exclusively as a vibration detector while the other piezoelectric element 7' is used exclusively as a vibrator, it is possible to efficiently suppress vibrations of the drum 1.

(Embodiment 2)

Figure 3:
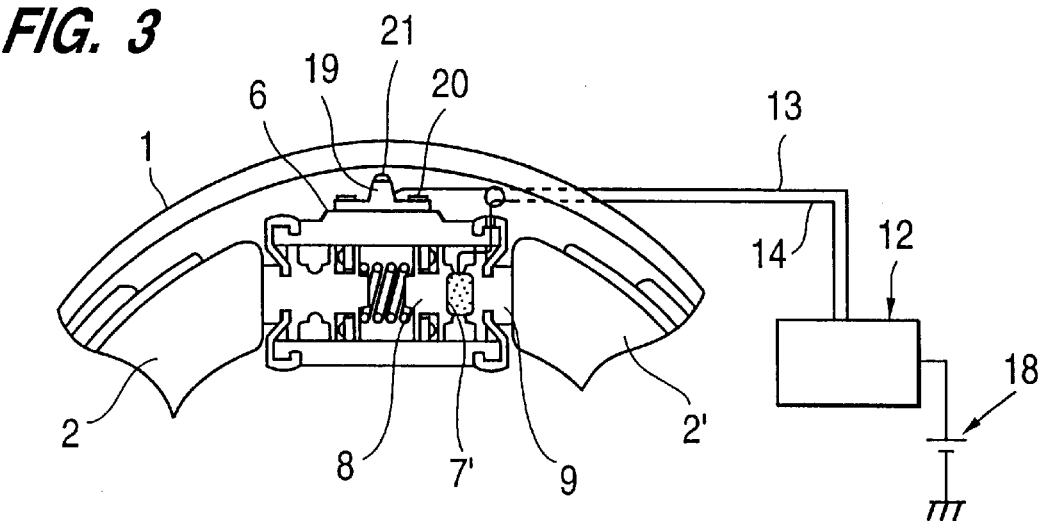
FIG. 3 shows a second embodiment of the present invention, which comprises a magnetic sensor for detecting the vibration of the drum while kept out of contact with the drum, and a piezoelectric element for applying vibration force to the drum.

FIG. 3 shows the second embodiment of the present invention. In this embodiment, a magnetic sensor 19 as a vibration detector is secured to an outer case of the wheel cylinder 6 by bolts 20 so that a suitable gap is present between a pole piece 21 of the magnetic sensor 19 and the inner surface of the drum 1. The magnetic sensor 19 picks up variations in the magnetic inductance due to the vibration of the drum 1, converts the variations detected into an electric signal, and inputs the signal in a feedback control circuit 12 identical to the circuit 12 of FIG. 1. The electric signal from the control circuit 12 is converted to vibration force by a piezoelectric element 7' provided between the first piston 8 and the second piston 9. The vibration force is applied to the other brake shoe 2' to reduce the vibration of the drum 1.

Even while the drum 1 is not vibrating, the magnetic inductance periodically varies because the gap between the inner surface of the drum 1 and the pole piece 21 of the magnetic sensor 19 varies as the wheel rotates. But the variation in inductance in such a state apparently differs in frequency from the frequency of vibration while the brake is squealing. Thus, it is possible to remove such periodic variations in inductance as noise via a filter.

In this arrangement, the magnetic sensor 19 as the vibration detector detects the vibration of the brake drum 1 without contacting the drum, while the piezoelectric element 7 as the vibrator acts directly on the brake shoe 2'. Thus, it is possible to efficiently reduce vibration of the drum.

(Embodiment 3)

Figure 4:
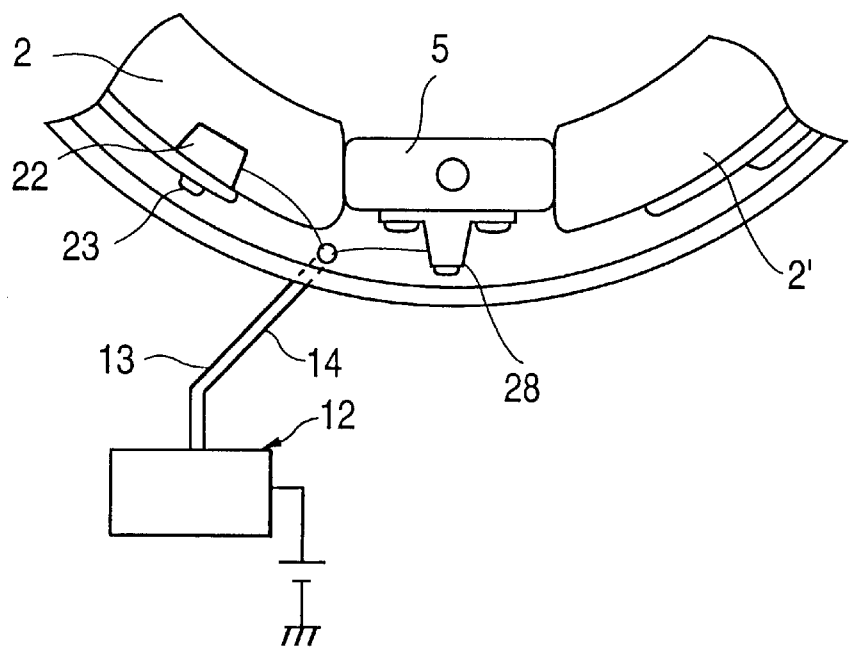
FIG. 4 shows a third embodiment of the present invention, which comprises an acceleration sensor for indirectly detecting the vibration of the drum, and a magnetic actuator for applying vibration force to the drum.
Figure 5:
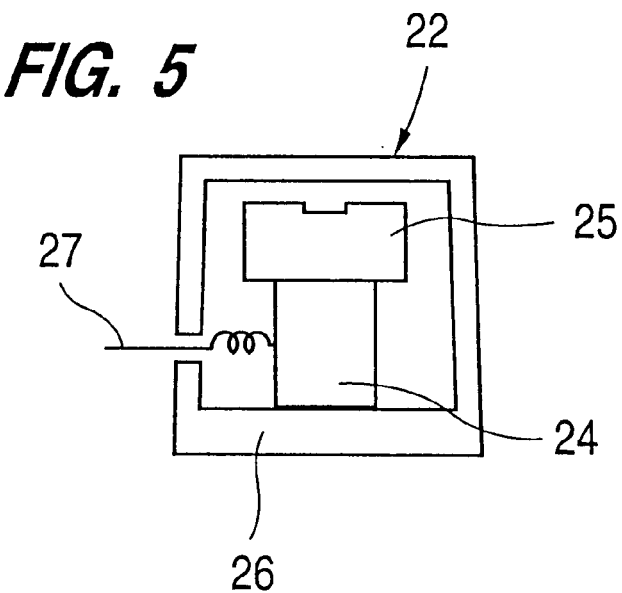
FIG. 5 shows a preferred acceleration sensor.

FIG. 4 shows the third embodiment of the present invention. In this embodiment, an acceleration sensor 22 as a vibration detector is fixed to the brake shoe 2 by bolts 23. The vibration of the drum 1 is converted to an electric signal by a piezoelectric element 24 in the acceleration sensor 22 and inputted in the feedback control circuit 12. FIG. 5 shows a preferred arrangement of the acceleration sensor 22. This sensor has a vibration receiving unit 25 mounted on the piezoelectric element 24. The members 24 and 25 are housed in a case 26 having a mounting base and connected to the outside by an output lead 27. The electric signal from the control circuit 12 is converted to vibration force by a magnetic actuator 28 fixed to the outer case of the anchor 5. The vibration force is applied directly to the drum 1 to reduce the vibration of the drum.

In this arrangement, the acceleration sensor 22 as the vibration detector detects the vibration of the brake drum 1, while the magnetic actuator 28 as the vibrator applies the vibration force directly to the drum 1 utilizing magnetic attraction and repulsion without contacting the drum. Thus, the damper of this embodiment is durable enough and can efficiently reduce the vibration of the drum.

(Embodiment 4)

Figure 6:
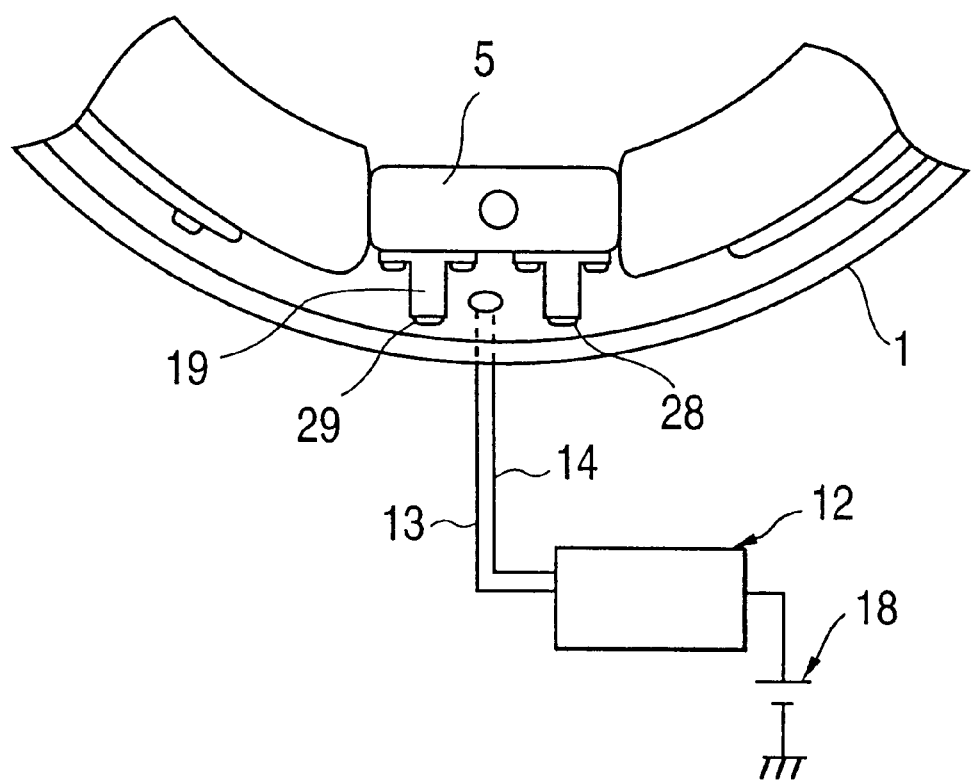
FIG. 6 shows a fourth embodiment of the present invention, which comprises a magnetic sensor for detecting the vibration of the drum while kept out of contact with the drum, and a magnetic actuator for applying vibration force to the drum.
Figure 7:
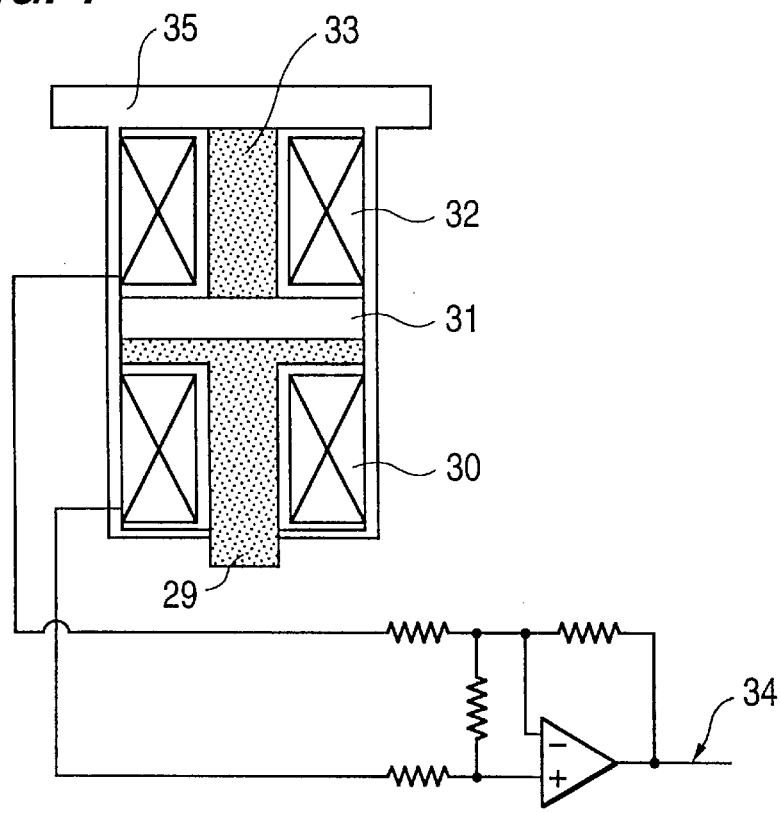
FIG. 7 shows a preferred magnetic sensor.
Figure 8:
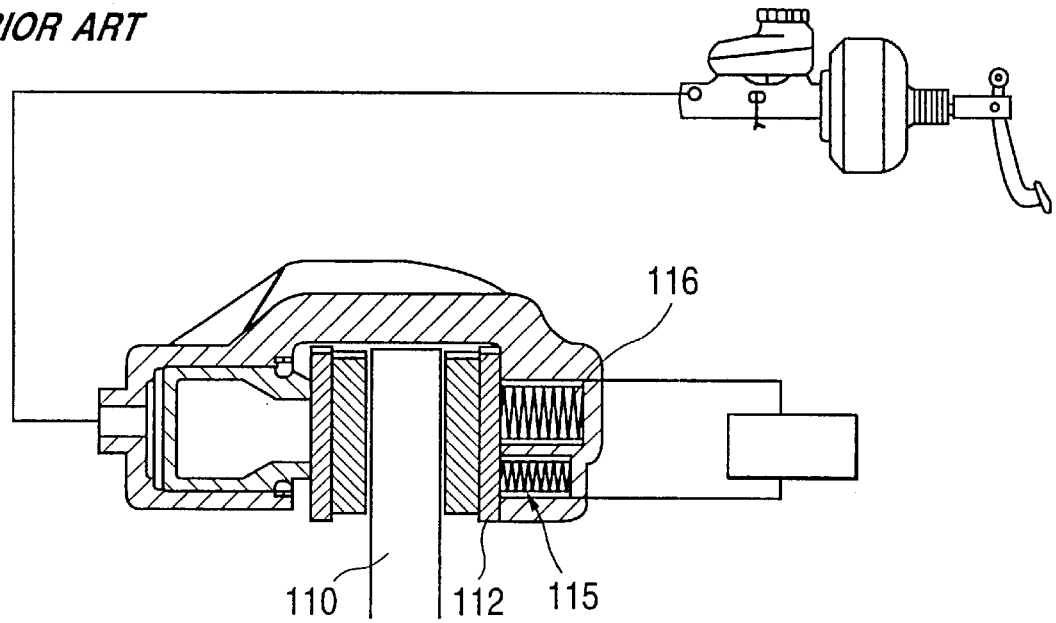
FIG. 8 shows a conventional arrangement in which the vibration is detected and vibration force is applied through a single common member.

FIG. 6 shows the fourth embodiment of the present invention. In this embodiment, a magnetic sensor 19 as a vibration detector is secured to an outer case of the anchor 5 so that a gap is present between a first pole piece 29 of the magnetic sensor 19 and the inner surface of the drum 1. The vibration mode detected by the magnetic sensor 19 should be outputted as a vibration force from the magnetic actuator 28 at a point as near to the point where the vibration is detected as possible. Thus, the magnetic sensor 19 is a little complicated in structure as shown in FIG. 7.

In order to cancel the influence of the magnetic field generated by the magnetic actuator 28, a differential output between a first coil 30 which energizes the first pole piece 29, and a second coil 32 which energizes a second pole piece 33, which is provided through a magnet 31, is outputted into the feedback control circuit 12 through an output terminal 34. Numeral 35 is a case of a non-magnetizable material.

That is, the magnetic sensor 19 picks up variations in the differential output of the magnetic inductance, converts them to an electric signal, and inputs the signal to the feedback control circuit 12, which is identical to the one shown in FIG. 2. The electric signal from the control circuit 12 is converted to a vibration force by the magnetic actuator 28 fixed to the outer case of the anchor 5, utilizing magnetic attraction and repulsion. The vibration force is applied directly to the drum 1 to reduce the vibration of the drum.

In this arrangement, the magnetic sensor 19 as the vibration detector detects the vibration of the brake drum 1 without contacting the drum, while the magnetic actuator 28 as the vibrator applies the vibration force directly to the drum 1 without contacting the drum. Thus, the damper of this embodiment is durable enough and can efficiently reduce the vibration of the drum.

As described above, according to the present invention, the drum vibration, which is a leading cause of squeals of the brake, is detected directly or indirectly in the form of an electric signal. After adjusting the phase and amplitude, the signal is converted to vibration force to reduce the vibration of the drum. Since the vibration detector and the vibrator are separate members and operate separately, it is possible to improve the operation accuracy of both the vibration detector and the vibrator. Vibration is detected and vibration force is applied directly or without contacting the drum. The detector and vibrator are thus durable.

What is claimed is:

1. A vibration damping system for use with a wheel of a vehicle, said vibration damping system comprising:
    a drum adapted to rotate together with the wheel of the vehicle;
    a pair of brake shoes;
    a biasing device operable to press said brake shoes against said drum;
    a vibration detector operable to detect vibrations of said drum and to provide an output indicative of the vibrations of said drum;
    a vibrator operable to apply vibration force to said drum, wherein said vibrator operates separately from said vibration detector; and
    a control circuit operable to suppress the vibration of said drum by controlling said vibrator based on the output of said vibration detector.

2. A vibration damping system as claimed in claim 1, wherein said vibration detector is operable to detect the vibration of said drum through one of said brake shoes, and said vibrator is operable to apply the vibration force to said drum through the other of said brake shoes.

3. A vibration damping system as claimed in claim 1, wherein said vibration detector is located out of contact with said drum, and said vibrator is operable to apply the vibration force to said drum through one of said brake shoes.

4. A vibration damping system as claimed in claim 3, wherein said vibration detector is a magnetic sensor comprising a magnet, a first coil, a second coil, and a pole piece, and is operable to detect the vibration of said drum based on a difference in output between said first coil and said second coil.

5. A vibration damping system as claimed in claim 1, wherein said vibration detector is operable to detect the vibration of said drum through one of said brake shoes, and said vibrator is located out of contact with said drum.

6. A vibration damping systems as claimed in claim 1, wherein said vibration detector and said vibrator are located out of contact with said drum.

7. A vibration damping system as claimed in claim 6, wherein said vibration detector is a magnetic sensor comprising a magnet, a first coil, a second coil, and a pole piece, and is operable to detect the vibration of said drum based on a difference in output between said first coil and said second coil.

8. A vibration damping system for use with a wheel of a vehicle, said vibration damping system comprising:
    a drum adapted to rotate together with the wheel of the vehicle;
    a pair of brake shoes;
    a biasing device connected to said pair of brake shoes and operable to press said brake shoes against said drum;
    a vibration detector, located near said drum, operable to detect vibrations of said drum and to provide an output indicative of the vibrations of said drum;
    a vibrator, located near said drum, operable to apply vibration force to said drum, wherein said vibrator operates separately from said vibration detector;
    a communication link; and
    a control circuit, operably linked to said vibration detector and said vibrator via said communication link, operable to suppress the vibration of said drum by controlling said vibrator based on the output of said vibration detector.

9. A vibration damping system as claimed in claim 8, wherein said vibration detector is connected to one of said brake shoes and is operable to detect the vibration of said drum through said one of said brake shoes, and said vibrator is connected to the other of said brake shoes and is operable to apply the vibration force to said drum through said other of said brake shoes.

10. A vibration damping system as claimed in claim 8, wherein said vibration detector is located out of contact with said drum, and said vibrator is connected to one of said brake shoes and is operable to apply the vibration force to said drum through said one of said brake shoes.

11. A vibration damping system as claimed in claim 10, wherein said vibration detector is a magnetic sensor comprising a magnet, a first coil, a second coil, and a pole piece, and is operable to detect the vibration of said drum based on a difference in output between said first coil and said second coil.

12. A vibration damping system as claimed in claim 8, wherein said vibration detector is connected to one of said brake shoes and is operable to detect the vibration of said drum through said one of said brake shoes, and said vibrator is located out of contact with said drum.

13. A vibration damping systems as claimed in claim 8, wherein said vibration detector and said vibrator are located out of contact with said drum.

14. A vibration damping system as claimed in claim 13, wherein said vibration detector is a magnetic sensor comprising a magnet, a first coil, a second coil, and a pole piece, and is operable to detect the vibration of said drum based on a difference in output between said first coil and said second coil.

15. A vibration damping system for use with a wheel of a vehicle, said vibration damping system comprising:
    a drum adapted to rotate together with the wheel of the vehicle;
    a pair of brake shoes;
    biasing means for pressing said brake shoes against said drum;
    vibration detection means for detecting vibrations of said drum and for providing an output indicative of the vibrations of said drum;

vibrator means for applying vibration force to said drum, wherein said vibrator means operates separately from said vibration detection means; and control means for suppressing the vibration of said drum by controlling said vibrator based on the output of said vibration detector.

16. A vibration damping system as claimed in claim 15, wherein said vibration detection means is functional for detecting the vibration of said drum through one of said brake shoes, and said vibrator means is functional for applying the vibration force to said drum through the other of said brake shoes.

17. A vibration damping system as claimed in claim 15, wherein said vibration detection means is located out of contact with said drum, and said vibrator means is functional for applying the vibration force to said drum through one of said brake shoes.

18. A vibration damping system as claimed in claim 17, wherein said vibration detection means is a magnetic sensor comprising a magnet, a first coil, a second coil, and a pole piece, and is functional for detecting the vibration of said drum based on a difference in output between said first coil and said second coil.

19. A vibration damping system as claimed in claim 15, wherein said vibration detection means is functional for detecting the vibration of said drum through one of said brake shoes, and said vibrator means is located out of contact with said drum.

20. A vibration damping systems as claimed in claim 15, wherein said vibration detection means and said vibrator means are located out of contact with said drum.

21. A vibration damping system as claimed in claim 20, wherein said vibration detection means is a magnetic sensor comprising a magnet, a first coil, a second coil, and a pole piece, and is functional for detecting the vibration of said drum based on a difference in output between said first coil and said second coil.

* * * * *